July 17, 1962 E. D. AGOMBAR ETAL 3,044,170
CABLE SHEATH SLITTING DEVICE
Filed Feb. 27, 1961 2 Sheets-Sheet 1
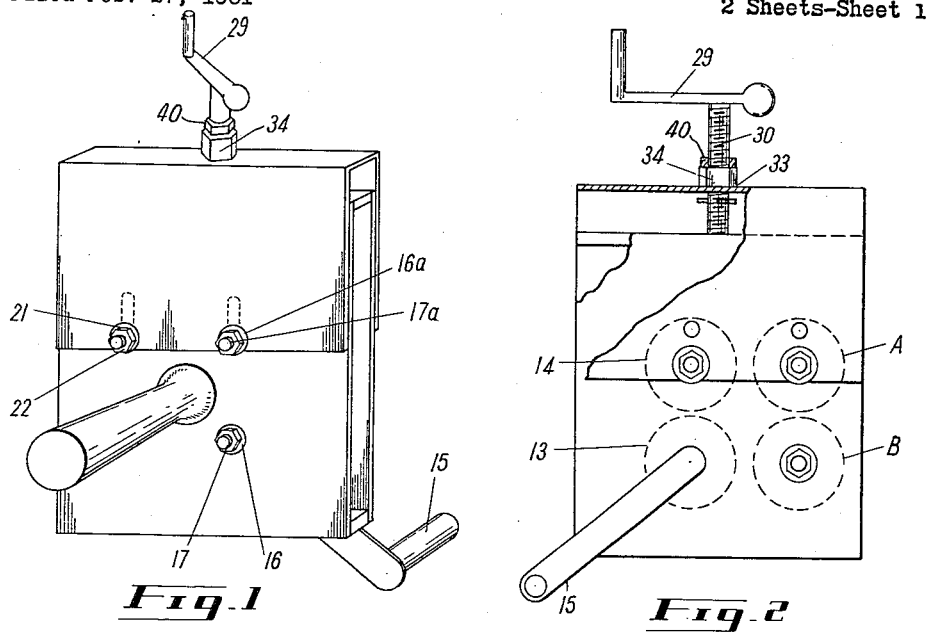
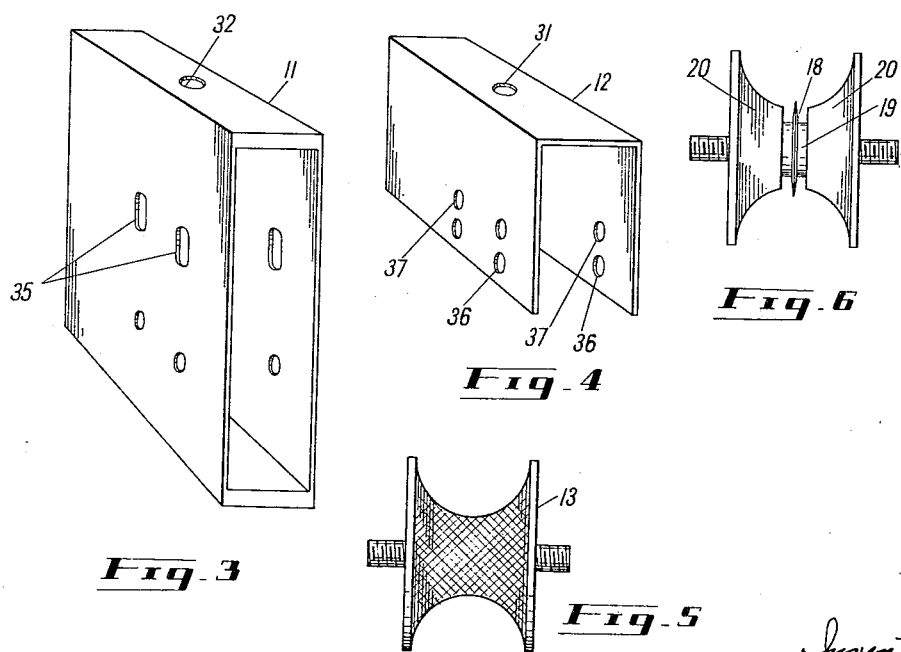

July 17, 1962    E. D. AGOMBAR ETAL    3,044,170
CABLE SHEATH SLITTING DEVICE
Filed Feb. 27, 1961    2 Sheets-Sheet 2

Inventors
Edward D. Agombar
Arthur B. Agombar
By Cushman, Darby & Cushman
Attorneys

United States Patent Office 3,044,170
Patented July 17, 1962

3,044,170
CABLE SHEATH SLITTING DEVICE
Edward D. Agombar, 1331 Crawford Ave., and Arthur B. Agombar, 918 Mary St., both of Fort William, Ontario, Canada
Filed Feb. 27, 1961, Ser. No. 92,075
Claims priority, application Canada Jan. 25, 1961
7 Claims. (Cl. 30—91)

This invention relates generally to a cable slitting device.

More particularly the invention relates to a tool which is constructed to cut a pair of slits along the length of cable sheaths so as to permit stripping thereof and facilitate easy access to the wires encased therewithin.

The present invention may be used to cut simultaneously a pair of slits along the length of cables of various sizes without damage to the elements within the casing by reason of the adjustability and disposition of the cutting disks.

The invention will find particular use as a hand tool and is capable of cutting through the cable sheaths formed, for example, of soft or hard copper, aluminum, lead or other similar soft metal sheaths. It has particular use in the removal of sheath from cable which is known widely under the trademark Pyrotenax or any magnesium oxide insulated cable.

It should be noted that when removing the sheaths from magnesium oxide insulated wires speed of removal and speedy completion of the operation should be achieved. It is important to avoid over-exposure of the contents of the cable sheath to air and moisture since this would affect the insulating properties of the cable. It will be apparent to those skilled in the art that when working with magnesium oxide insulated wire a cut-back of at least ten inches is required to remove the outer casing or sheath so as to give access to work with the inner wires. The sheath should be re-sealed within about 10 minutes and the work on the inner wires completed within that period. If excess moisture was allowed to penetrate into the magnesium oxide insulating powder a pressure build-up would occur and the insulation would blow out rendering the cable useless. It should also be noted that dents caused by pinching or pressure during the cutting operation may allow air to seep into the magnesium oxide insulation. This should be avoided.

It will immediately be realized, therefore, that the machine used for cutting the cable sheaths should be quick, efficient, easy to operate, and also operable without damage or deformation of the cable.

The need for such a device is clearly apparent and the main object of this invention is to fill this need.

A more particular object of the invention is the provision of a simple, reliable and economic tool capable of quickly and efficiently cutting cable sheaths in one time-saving operation and be so constructed as to enable the operator to carry it with ease.

According to the invention a cable slitting device comprises a main body, a pair of cutting assemblies, a cutting disk on each of said assemblies, said assemblies being housed within and rotatably mounted upon said body, said assemblies being positioned and dimensioned to receive a cable between and in contact with said cutting disks, means for driving the cable between said disks thereby simultaneously forming a pair of slots along the length of said cable.

FIGURE 1 is a perspective view of the present invention;

FIGURE 2 is a side elevation of the opposite side to that of FIGURE 1 showing the location of the driving spool and cutting assemblies of the present invention;

FIGURE 3 is a perspective view of the casing of the present invention;

FIGURE 4 is a perspective view of an adjusting cap adapted to slide over the top of the casing of FIGURE 3;

FIGURE 5 is an elevation of a driving spool of the present invention;

FIGURE 6 is an elevation of a cutting assembly of the present invention;

Figure 7:
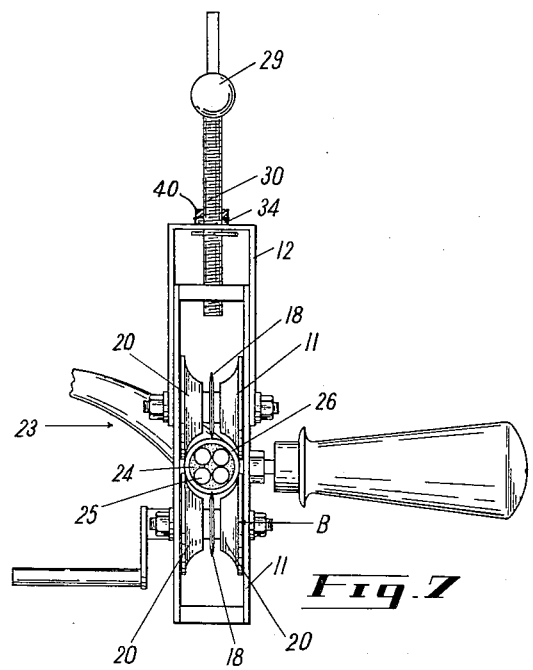
FIGURE 7 is an end view of the present invention showing a cable held between the cutting disks thereof.

Referring more particularly to the drawings, FIGURE 3 shows a casing 11 over which an adjustable cap 12, shown in FIGURE 4, may be slidably mounted as seen in FIGURE 1. A driving spool 13 and a guiding spool 14 are shown in FIGURE 2 and the particular construction thereof is best seen in FIGURE 5. The driving spool 13 is secured to the driving handle 15 so that on rotation of said handle the spool 13 also rotates. The washers 16 and the nuts 17 serve to hold the handle 15 and spool 13 in operative position with respect to the casing 11. Similarly, the guiding spool 14 is held by the washers 16a and the nuts 17a. A pair of cutting assemblies are designated generally at A and B. Forming the assemblies A and B are cutting disks 18 of the floating type rotatably mounted on the shafts 19 between a pair of spool elements 20 which co-operate to provide a rotatable cable-receiving spool. The washers 21 and the bolts 22 hold the cutting elements in position on the casing 11.

A cable designated generally at 23 is shown in FIGURE 7 in the process of being slit by the cutting disks 18 which may be magnesium oxide powder, for example, and a plurality of conducting wires 25. The sheath to be cut is numbered 26.

Figure 8:
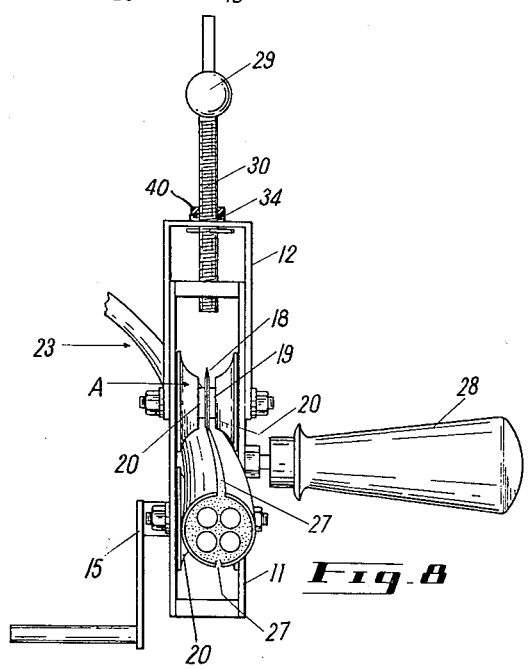
FIGURE 8 is a view similar to FIGURE 7 but showing the slits formed in the cable after passing between the cutting disks of the present invention.

FIGURE 8 shows the cable 23 after it has passed between the cutting disks 18. A pair of slots 27 have been formed therein by the action of the disks 18.

Since the present invention will find great use as a hand tool a handle 28 is provided which is rigidly mounted on the casing 11. This handle may not be necessary if the invention is adapted for use as a power tool. However, when used as a hand tool it is clear that the handle will have a stabilizing effect during the cutting operation.

The adjusting cap 12 is slidable up and down over the casing 11 by turning the lever 29. A threaded shaft 30 is operatively connected to the lever 29 and extends through aligned aperture 31 formed in the adjusting cap 12 and is threaded through aperture 32 in casing 11, as can be seen in FIGURES 4 and 3 respectively. A cotter pin 33 passes through the centre of the shaft 30 and has the effect of restricting the movement of said shaft and ensures that the adjusting cap 12 is always connected to the casing. A nut 34 and a lock-nut 40 similarly restrict the movement of the shaft 30. The extent of upward or downward movement of the cap 12 over the casing 11 is determined by the size of the slots 35 (see FIGURE 3) formed in the sides of said casing. It can be seen from FIGURES 1 and 7 that the shafts of the cutting assembly A and the guiding spool 14 pass through apertures 36 formed in the adjusting cap 12 (see FIGURE 4) and through the slots 35 of the casing 11. The apertures 37 in the adjusting cap may be used instead of the apertures 36 so that cables of different sizes may be cut. Further apertures may be formed in the adjusting cap to expand the ranges of cable which may be cut by the present invention.

The operation of the invention may be simply explained. Firstly, the adjusting cap 12 is raised by turning the lever 29 in an anticlockwise direction. This permits the free insertion of the cable to be cut between the cutting assemblies A and B and in contact with the driving spool 13. It may be noted that the spool 13 can usefully be provided with a knurled or corrugated surface in order to improve its gripping and driving effectiveness on the cable to be cut. The surfaces should not be so rough as to dent or deform the uncut portion of cable thus causing unnecessary waste. Upon insertion of the cable so that its leading end is immediately between the cutting assemblies, the adjusting cap is closed by turning the lever 29 in a clockwise direction until the cutting disks 18 penetrate the surface of the sheath 26. The operator may then grip the handle 28 and turn the driving handle 15. This turns the spool 13 carrying the cable 23 and drives it forward between the cutting assemblies A and B, as is clearly shown in FIGURE 7. The driving spool 13 should be able to move the cable forward without causing damage to the uncut section of the sheath. A pair of slits 27 are thus simultaneously formed in the sheath 26. The driving action is continued until the desired length of slits have been formed. On completion of the horizontal cut the adjusting cap 12 is slackened off and the cable 23 is removed.

The cable 23 can also be reversed through the cutting assemblies should it appear desirable, for example, to pass the disks over the sheath a second time. The reversing action is accomplished by simply turning the drive handle in the opposite direction. It may be noted that more or less than two feet of sheath need be removed at any time. A suitably placed section of the casing 11 aligned with the cutting assemblies may be cut away so as to permit the operator to view the slit being formed in the sheath 26.

An advantageous feature of the invention is that the driving spool 13 and guiding spool 14 may be interchanged to correspond with the size of cable to be cut. As illustrated these spools correspond in contour to the cable 23 so as to avoid deformation of the cable as it passes therethrough. One of the reasons for this is that when a cable has been cut a furl is attached to one end thereof. Any deformation in the uncut section of the cable would cause a misfit in the furl. The cutting assemblies may be employed for all size of cables within reason and within the dimensions of the driving and guiding rolls. It is not so important to change the cutting assemblies with each change in cable size.

The particular embodiment disclosed is for use as a hand tool. It may also be mounted as a tripod for easier handling in certain circumstances. The invention may also be used in the form of a power tool embodying obvious modifications to the principles disclosed which would occur to one skilled in the art.

The advantages of the invention which is easy to operate, inexpensive to manufacture, and has few working parts, are clearly apparent. It may be operated efficiently in a confined space and will prove beneficial and advantageous over known devices previously used.

We claim:

1. A cable slitter comprising a main body, a pair of cutting assemblies, a cutting disk on each of said assemblies, means for adjusting the distance between the cutting disks of said cutting assemblies, said assemblies being housed within and rotatably mounted upon said body, said assemblies being positioned and dimensioned to receive a cable between and in contact with said cutting disks, means for driving the cable between said disks thereby simultaneously forming a pair of slots along the length of said cable, said driving means comprising a cable-receiving spool rotatably mounted on and within said body, a driving handle attached to the shaft of said driving spool on the outside of said body, and a guiding spool, both said spools being rotatably housed within and upon said body behind said cutting assemblies, said spools being positioned and dimensioned to receive a cable and urge it forward between said cutting assemblies by the application of said driving means.

2. A cable slitter as claimed in claim 1, in which a stabilizing handle extends outwardly from that side of said body remote from means for operably rotating said drive means.

3. A cable slitter comprising a main body, a pair of cutting assemblies, a cutting disk on each of said assemblies, means for adjusting the distance between the cutting disks of said cutting assemblies, said assemblies being housed within and rotatably mounted upon said body, said assemblies being positioned and dimensioned to receive a cable between and in contact with said cutting disks, means for driving the cable between said disks thereby simultaneously forming a pair of slots along the length of said cable, said driving means comprising a cable-receiving spool rotatably mounted on and within said body, and a driving handle attached to the shaft of said driving spool on the outside of said body, means for adjusting the distance between the cutting disks of said cutting assemblies comprising an adjusting cap dimensioned to slide freely over the normally upper portion of said body, aligned apertures in said cap and the top of said body, a threaded shaft extending downwardly through said apertures, the shaft of one of said cutting assemblies extending through both the sides of said body and vertical slots formed in the sides of said body, whereby on turning said threaded shaft the plate is caused to move vertically over said body and said one cutting assembly is adjustable vertically within the slots of said body.

4. A cable sheath slitting device comprising a main housing and a second housing in sliding engagement therewith, upper and lower cutting assemblies rotatably mounted within said main housing and adapted to simultaneously form a pair of longitudinal slots on the sheath of a cable passed therebetween, said upper cutting assembly being mounted on said upper housing and within said main housing, a driving spool and a guiding spool positioned to receive a cable therebetween and aligned with said cutting assemblies, and urge it between said cutting assemblies, said driving spool being adapted for connection to a driving source, said main and second housings co-operating to provide means for simultaneously and selectively adjusting the spacing both between said cutting assemblies and said guiding and driving spools and means for operatively securing the assemblies and the spools in the positions so selected.

5. A cable sheath slitting device as claimed in claim 4 wherein the mountings of one of said assemblies and one of said spools are passed through elongated slots formed in opposite sides of said main housing and within corresponding apertures formed in said second housing, means connected with both said housings for adjusting the same relative to each other thereby providing means to adjust simultaneously and selectively the spacing between said assemblies and said spools to accommodate various sized cables.

6. A cable sheath slitting device as claimed in claim 4 in which said adjusting means comprises a threaded shaft extending through aligned apertures in said housings, one of which is in threaded engagement with said shaft and means securing said shaft in selected axial position, whereby on turning said shaft the position of said second housing slidably connected with said first housing is caused to change.

7. The device as claimed in claim 4 including a driving handle attached to the shaft of said driving spool on the outside of said main housing and a gripping handle extending outwardly from a side of the housing remote from said driving handle.

References Cited in the file of this patent

UNITED STATES PATENTS

| | | |
|---|---|---|
| 1,686,044 | Stott | Oct. 2, 1928 |
| 1,881,020 | McFarland | Oct. 4, 1932 |
| 2,031,470 | Eck et al. | Feb. 18, 1936 |
| 2,374,753 | Kramer | May 1, 1945 |
| 2,548,977 | Jaeger | Apr. 17, 1951 |
| 2,647,309 | Chisena | Aug. 4, 1953 |